Patented Jan. 10, 1928.

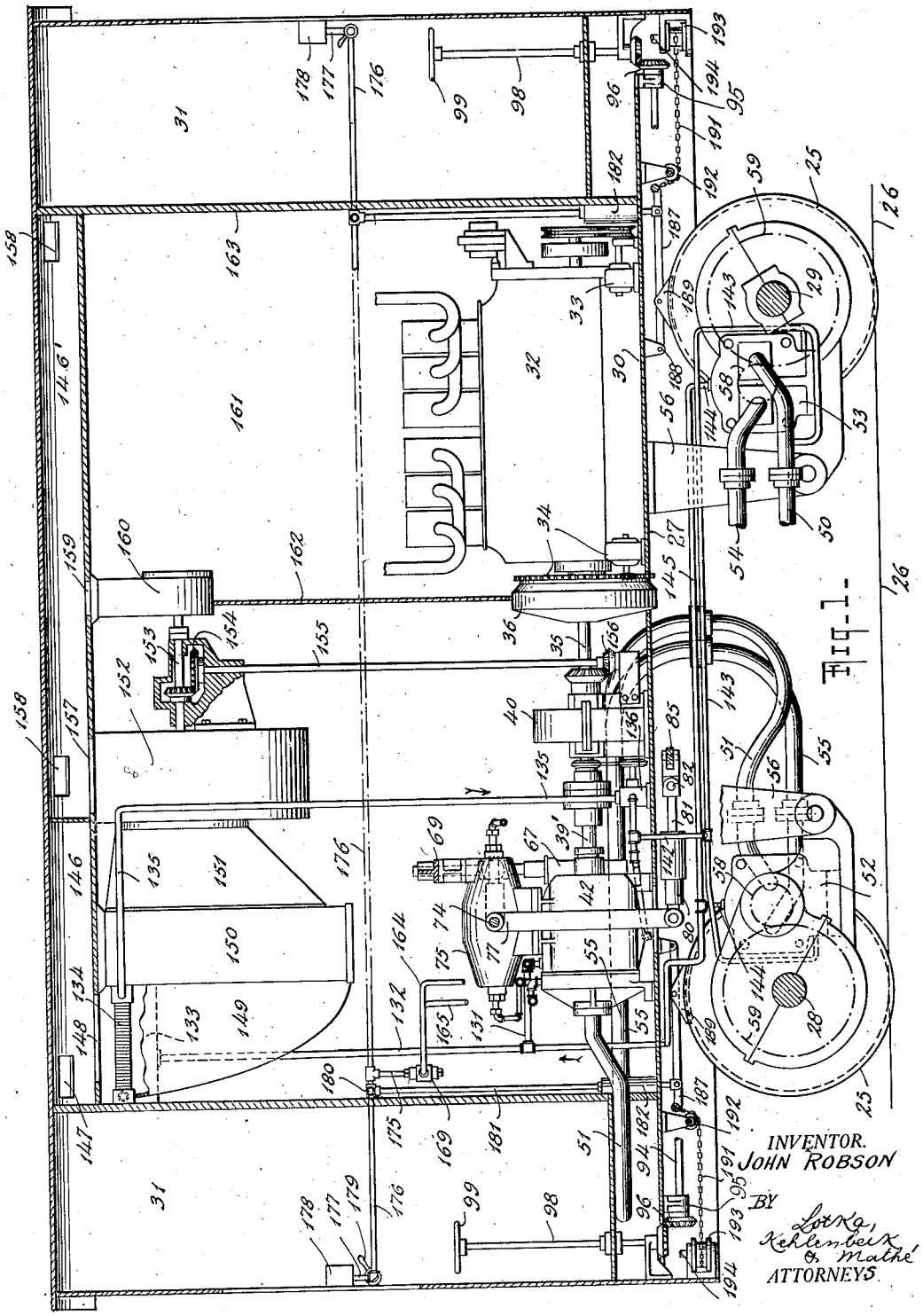

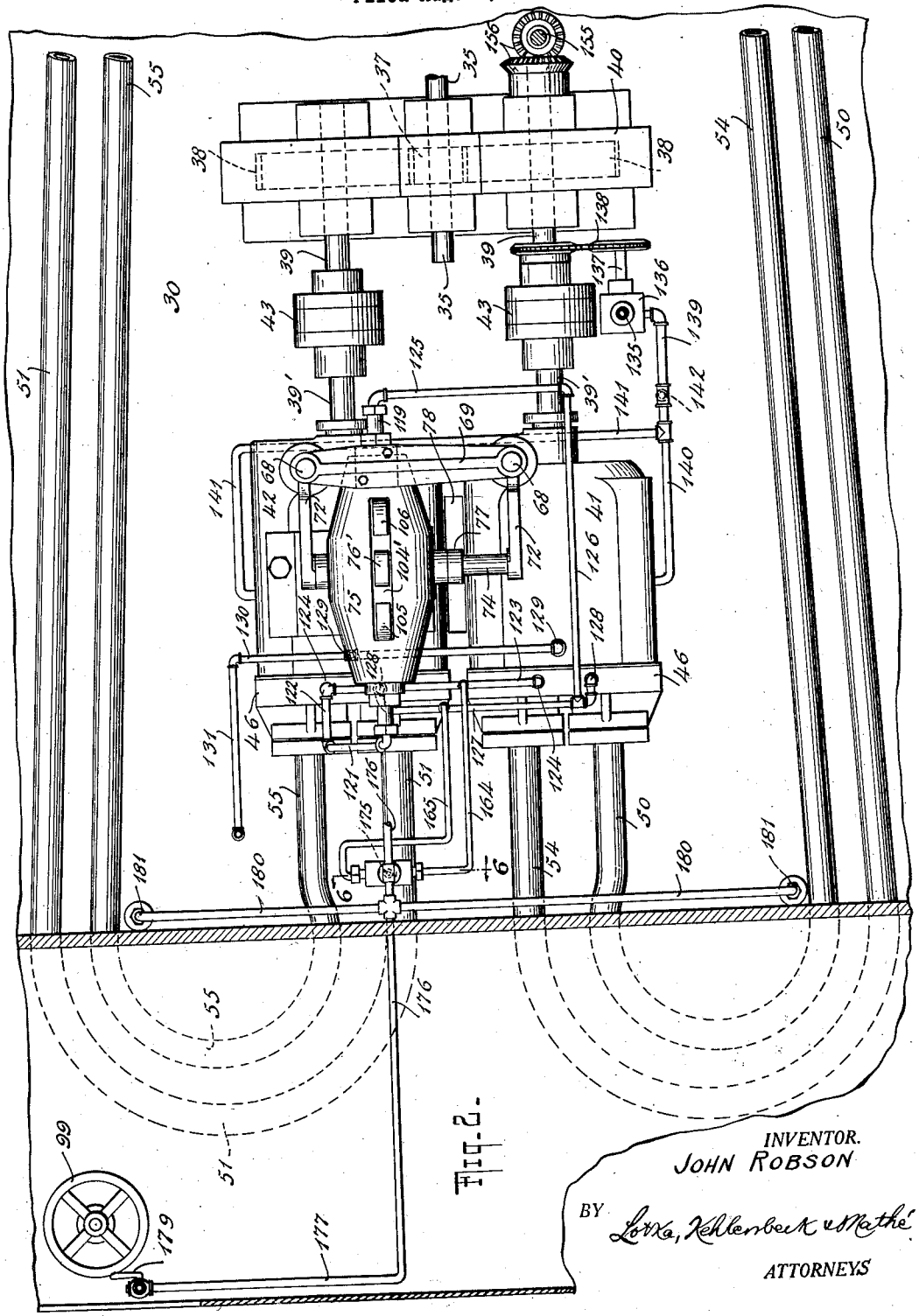

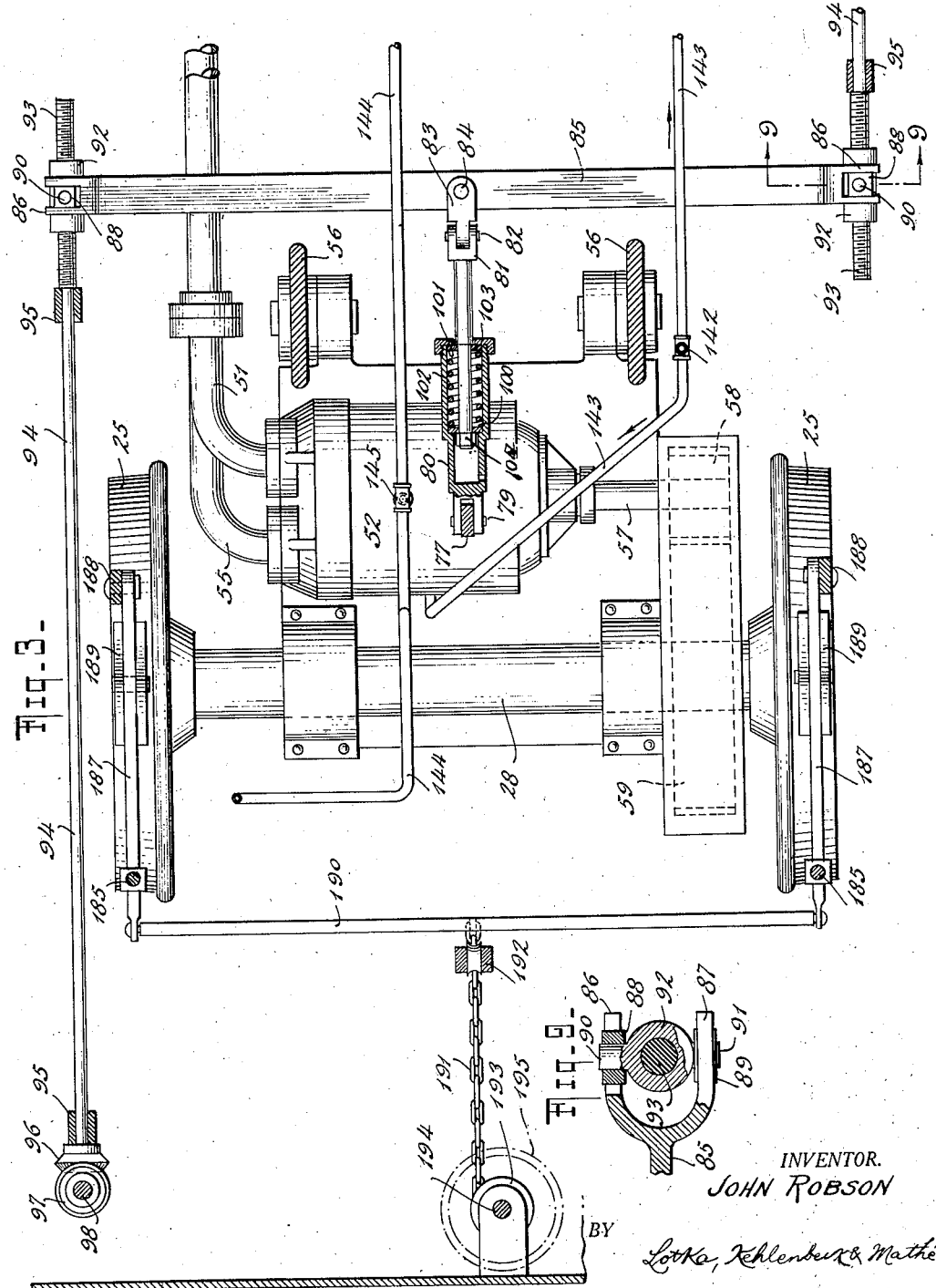

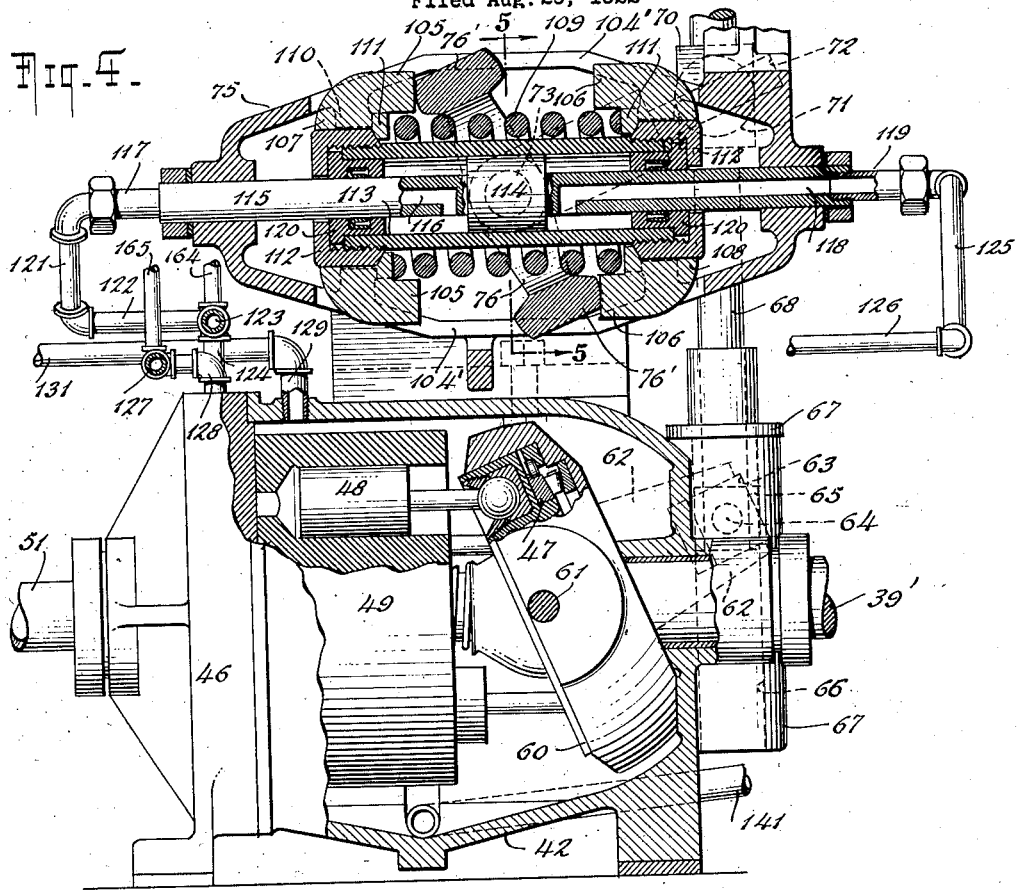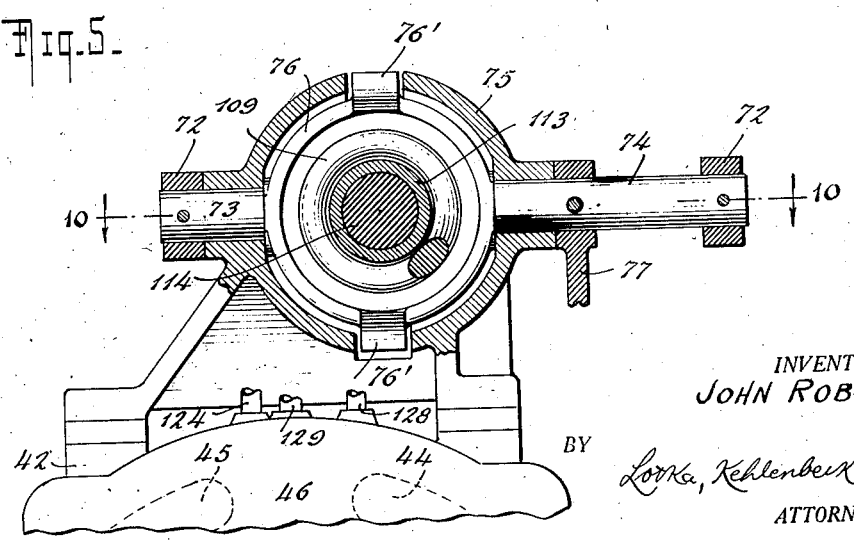

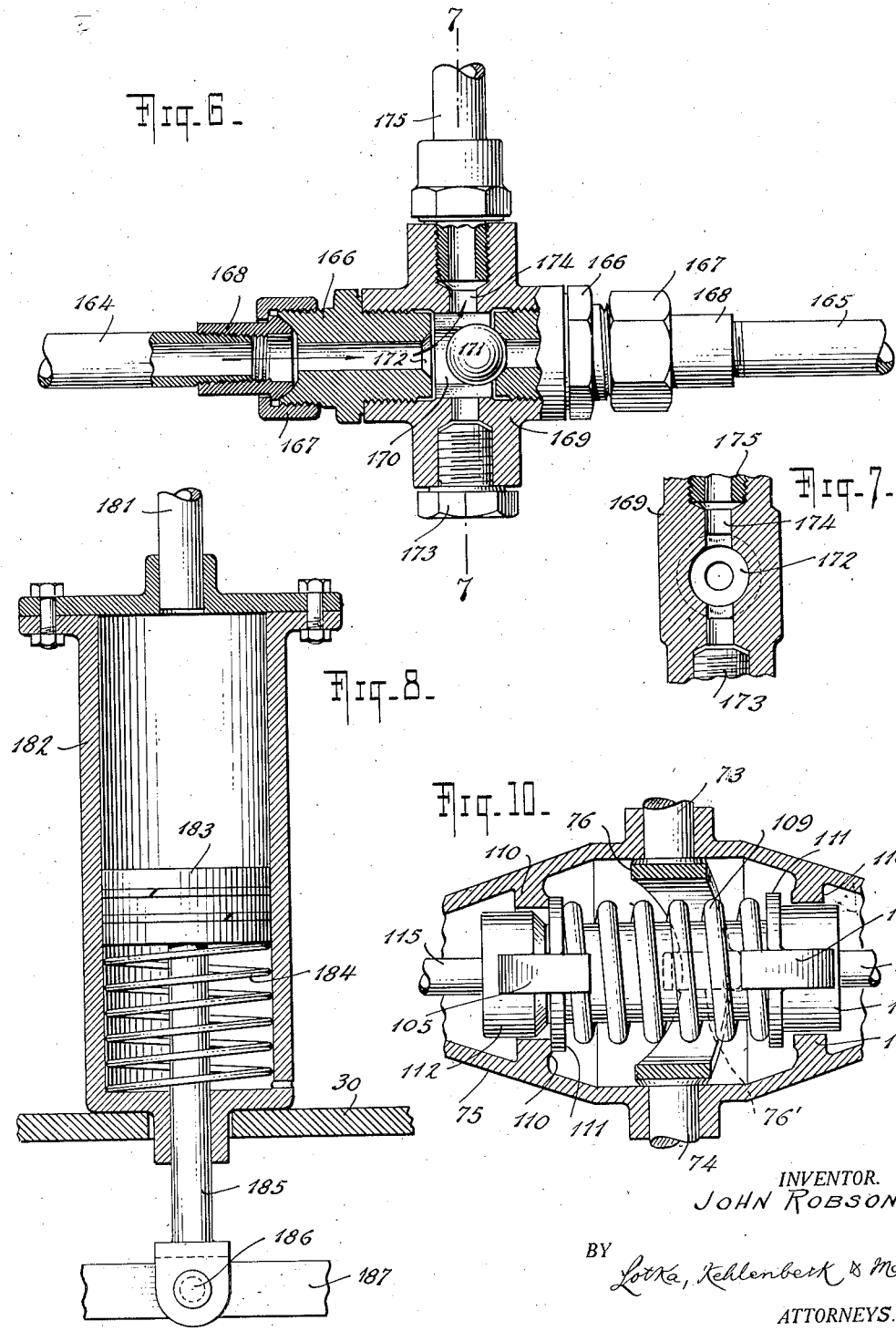

1,655,740

UNITED STATES PATENT OFFICE.

JOHN ROBSON, OF WATERBURY, CONNECTICUT, ASSIGNOR TO UNIVERSAL ENGINEERING CORPORATION, OF MONTREAL, QUEBEC, CANADA, A CORPORATION OF CANADA.

POWER PLANT, PARTICULARLY FOR LOCOMOTIVE ENGINES.

Application filed August 29, 1922. Serial No. 584,944.

My invention relates to power plants, and particularly to such as are intended to operate locomotive engines, that is to say, self-propelled vehicles, generally running on rails, and I desire the term "locomotive" to be understood broadly, so as to include a self-propelled vehicle which has provisions for carrying passengers, baggage, or freight. The object of my present invention is to provide an efficient and compact power plant, particularly in conjunction with an internal combustion engine, which will be very flexible in operation, especially in regard to change and control of speed. Certain features of my invention relate to means for controlling the speed of the drive both manually and automatically. Another feature has reference to supplying the motive power at a plurality of points, for instance at a plurality of driving axles. Still another feature relates to the brake mechanism and means for operating it automatically under certain conditions. Other features and advantages of my invention will be explained in the detailed description following hereinafter, and the novelty will be defined in the appended claims. It will be understood that certain features of my invention, as will appear from the said claims, are novel broadly, that is to say, irrespective of their use in conjunction with other features of the invention not mentioned in these particular broad claims.

My invention has been designed primarily for use on a shunting locomotive, but as stated above, the invention is of broader scope. A satisfactory and preferred embodiment of this invention is shown, by way of example, in the accompanying drawings, in which Fig. 1 is a side elevation, with parts in section, of a locomotive adapted for shunting work; Fig. 2 is a plan of the forward portion of the locomotive, on an enlarged scale, with parts in section; Fig. 3 is a plan view of the front axle and its drive, with parts in section in a plane below that of Fig. 2, and also shows certain features of the speed-control mechanism; Fig. 4 is a side elevation with parts in section, showing one of the pumps forming part of the power plant, together with a portion of the automatic speed control; Fig. 5 is a cross section on line 5—5 of Fig. 4; Fig. 6 is a detail vertical section, substantially on line 6—6 of Fig. 2; Fig. 7 is a partial vertical section on the line 7—7 of Fig. 6; Fig. 8 is a detail vertical section showing a brake cylinder and its connections; Fig. 9 is a detail vertical section on line 9—9 of Fig. 3; Fig. 10 is a plan view of the parts shown in Fig. 5, with parts in section on line 10—10 of Fig. 5.

The locomotive illustrated by the accompanying drawings comprises wheels 25 of usual character adapted to run on rails 26, and a frame or body 27 suitably supported on the axles 28, 29. The floor of the body is indicated at 30, and I prefer to arrange cabs 31 at both ends, so that the engineer may control the operation from either end. In the embodiment illustrated, the wheels 25 are rigid on the respective axles 28 and 29.

At the rear portion of the locomotive, I have shown the gasoline engine 32, of any suitable construction, which furnishes the power for propelling the locomotive, and also, if desired, for auxiliary work such as the driving of a dynamo 33 to furnish current for the headlights and for a storage battery used in conjunction with said lights. Said engine may be started in any suitable manner, a portion of an electric starting mechanism of well-known type being indicated at 34 in Fig. 1. The engine shaft 35, which extends horizontally in the longitudinal center of the locomotive, is provided with a flywheel 36 and, in advance thereof, with a pinion 37, in mesh with two large gear wheels 38 mounted on horizontal longitudinal shafts 39 which, like this portion of the engine shaft 35, are journaled in a housing 40. I thus obtain the requisite speed reduction between the engine shaft 35 and the shafts 39.

The shafts 39, which rotate in the same direction, constitute the drive shafts for two variable speed liquid pumps the housings of which are indicated at 41, 42. I have not illustrated all the details of this liquid pump for the reason that in its main features it is well-known, pumps of this type being disclosed in Harvey D. Williams' Letters Patent of the United States No. 925,148 dated June 15, 1909 and No. 1,044,838 dated November 19, 1912. The pump shafts 39′ might be integral with the drive shafts 39, although in the example illustrated I have indicated a suitable clutch connection 43 between each shaft 39 and the pump shaft 39' aligning therewith. In Fig. 5 I have indicated by dotted lines the two segmental ports 44, 45 with which the end plate or valve plate 46 of each pump is provided, said plate corresponding to the midplate of the Williams patents above referred to, and to the end plate 16 of Reynold Janney's Letters Patent of the United States No. 1,020,285, dated March 12, 1912. As set forth in said patents, one of said ports 44, 45 constitutes a suction port for the pump, and the other a delivery port or pressure port, and whether 44 or 45 shall be the suction port depends on the direction in which the pump shaft 39' rotates and also on the direction in which the driving member or so-called swash-plate 47 of the pump is inclined relatively to a transverse vertical plane. As described in said patents, the rotation of the swash-plate 47 with the shaft 39' will produce a reciprocation of the pistons 48 in a pump barrel 49 rotating in unison with said shaft, the stroke of the pistons depending on the inclination of said plate. In the construction shown, the liquid propelled by the pump 41 will operate the rear axle 29, while the liquid propelled by the pump 42 will actuate the front axle 28. For this purpose, the ports 44 of the end plates of the two pumps 41, 42 are connected by pipes 50, 51 with one port of the end plates of the motor casings 53, 52 respectively, while the other ports of the end plates of these motor casings 53, 52 are connected by pipes 54, 55 with the other ports, 45, of the pumps 41 and 42 respectively. The motor casings 52, 53 are supported on the frame 27 by means of hangers 56, or in any other suitable manner. The motors contained in said casings are reversible rotary motors of any suitable construction adapted to be operated by fluid supplied under pressure through the pipes 50, 51 or 54, 55 respectively, the other pipes (54, 55 or 50, 51 respectively) serving for the return of the liquid to the pumps. The motors, the shaft of one of which is indicated at 57, will rotate in one direction or the other, according as the ports 44 or the ports 45 are the pressure ports of the pumps. Any suitable reversible fluid motor may be employed at 52, 53; in practice I prefer to employ motors of a construction similar to the pumps, as disclosed in the Williams patents mentioned above. From the motor shafts, power is transmitted to the axles 28, 29 by means of pinions 58 on said shafts meshing with toothed wheels 59 on said axles.

The pump swash-plates 47 rotate on adjustable boxes 60 pivoted at 61. The position or inclination of the two tracks or boxes 60 is always the same in the two pumps 41, 42, but both tracks or boxes may be adjusted simultaneously about the pivot axis 61, either to a neutral position in which the swash-plates 47 will be perpendicular to the shafts 39', so that the pump barrels 49 will rotate without any reciprocation of the pistons 48, or to positions inclined in one direction or the other, and in various degrees, whereby the corresponding fluid motors 52, 53 will be operated to rotate in one direction or the other, and at various speeds. According to the adjustment of the pump tracks or boxes 60, the motors 52, 53 and the axles 28, 29 will therefore be rotated for either forward or rearward travel of the locomotive, or the locomotive will not be driven at all, notwithstanding the rotation of the pump barrels 49, if the pump tracks or boxes 60 are in the neutral position above referred to.

The mechanism for the simultaneous and equal adjustment of both pump tracks or boxes 60, so that each of them will always be in the same position with reference to the pump shaft 39' as the other track or box 60, is preferably constructed as shown in Figs. 1 to 5, 9 and 10. Each box or track 60 is formed at one side with a forked extension 62 having sliding engagement with a lug 63 mounted pivotally on a pin 64 carried by a slide 65 movable along a stationary vertical guide 66 in an extension 67 of the pump casing. The slides 65 have upwardly-extending rods 68 connected rigidly to a horizontal arm or beam 69, so that they will move in unison. The rods 68 are also formed with boxes 70 having seats of proper shape to receive balls or rollers 71 and to allow said balls or rollers to rock about horizontal axes. Such balls or rollers have transverse apertures through which extend, with a longitudinal sliding fit, the reduced ends of arms 72 which are secured rigidly to a rocking structure comprising two spaced aligning trunnion pins 73, 74 fulcrumed on a stationary casing 75, and a ring-shaped connecting member 76 secured to said pins rigidly. The axis of the rocking structure (pins 73, 74) is parallel to that of the fulcrums 61, it being understood that the fulcrums 61 of the two pumps 41, 42 are in axial alignment. In the rocking structure just referred to is secured rigidly, at about the longitudinal center of the locomotive, a downwardly-extending arm or lever 77, movable forward and rearward in a slot or opening 78 in the floor 30.

The lever 77 and the rocking structure connected therewith, may be operated either by the engineer or automatically to control the speed and the direction of the locomotive's travel. For manual control by the engineer, the following mechanism is provided: The lower end of the lever 77 is connected pivotally at 79 with a rearwardly-extending link, here shown as extensible by being made of two telescoping portions 80, 81, of which the latter is connected by a transverse horizontal pivot 82 with a forked connecting member 83 having a vertical pivot connection 84 with a floating lever 85 extending transversely. The ends of the lever 85 have like upper and lower forks 86 and 87 respectively (Figs. 3 and 9) in sliding engagement with the parallel sides of lugs 88 and 89 respectively mounted pivotally on vertical aligning pins 90, 91 respectively projecting from nuts 92. These nuts, which owing to the arrangement just described are held against rotation, are in threaded engagement with the screw portions 93 of shafts 94 journaled in suitable stationary bearings 95 and extending lengthwise of the locomotive. Near the ends of the locomotive, the shafts 94 carry bevel pinions 96 in mesh with similar pinions 97 at the lower ends of vertical shafts 98 the upper ends of which are provided with hand wheels 99. The two portions 80, 81 of the extensible link are connected as follows: One of them, 80, is constructed as a cylinder in which are movable two piston like plates 100 and 101 between which a spring 102 is coiled on the rod-like end of the other link portion 81. Under the normal conditions shown in Fig. 3, the spring 102 will be fully expanded, pressing the piston-plate 100 against a shoulder in the link portion 80, and the piston-plate 101 against a cap 103 on said link portion. The spring 102 also normally holds the piston-plate 100 in engagement with a nut or like head 104 secured to the inner end of the rod 81 thus forcing the said rod towards the left in Fig. 3 to hold a shoulder provided thereon in engagement with the piston plate 101 whereby the link portion 81 is normally pulled into the link portion 80.

Now, if one of the hand wheels 99 is turned, this will cause the nut 92 on the corresponding shaft 94 to move lengthwise, causing the floating lever 85 to swing substantially about a vertical axis formed by the pins 90, 91 of the other nut 92. This will carry the pivot connection 84 forward or rearward of the locomotive according to the direction in which the hand wheel is turned, the link portion 81 being carried in the same direction as the lever 85, and the link portion 80 following at once by reason of the shoulder on the rod of the link portion 81 pushing the collar 101 forward, and acting through the spring 102 and collar 100, to push the link portion 80 forward if the motion of the lever 85 is forward, while on the rearward motion of the lever 85 the link portion 80 will be pushed rearward by the portion 81 by reason of the nut or head 104 pushing the collar or plate 100 rearward and acting through the spring 102 to force the collar 101 and the cap 103 rearward with the link portion 80, the initial compression of the spring being greater than the resistance of the actuated parts connected with said link portion 80. The lever 77 will thus be swung forward or rearward, rocking the pins 73, 74 and the arms 72 to carry the rods 68 either up or down, whereby the inclination of the pump tracks or boxes 60 will be altered, to increase or decrease the amount of liquid delivered by the pumps 41, 42 at each revolution of their shafts, and also (if the inclination of said boxes 60 be reversed) to reverse the direction of flow of the liquid with respect to the valve ports 44, 45. The speed of the liquid motors 52, 53 may thus be varied, these motors may be reversed, or, by bringing the boxes 60 to their neutral position, the motors 52, 53 may be stopped even though the engine 32 continues to run.

So far as the hand control just described is concerned, the link 80, 81 need not be made in telescopic sections, but a solid link might be employed connected at 79 with the lever 77, and at 82 with the member 83. The telescopic construction of the link 80, 81, with the interposed spring 102, has been adopted in view of certain features of the automatic pressure and speed control which I am about to describe, the object of the particular construction shown being to enable the control to be effected either manually (by the engineer) or automatically, without mutual interference.

The automatic control mechanism is constructed as follows: The ring-shaped rocking connecting member 76 has upper and lower projections 76' movable within longitudinal slots 104' of the casing 75 and adapted to engage lugs 105, 106 likewise movable within said slots, lengthwise of the casing 75. These lugs are integral with rings 107, 108 respectively, which a coiled spring 109 tends to seat on projections 110 integral with the casing 75, said projections being interrupted by the slots 104, but otherwise annular. The rings 107, 108 also have annular inward projections 111, preferably with beveled or conical surfaces, as shown, which are normally pressed by the spring 109 against corresponding surfaces on caps 112 screwed on the ends of a cylinder 113 surrounded by the spring 109. The caps 112 are therefore at a constant distance from each other, as are also the projections 110. The cylinder 113 fits on a stationary piston 114 secured to a stationary piston rod 115 having a longitudinal channel 116 by which the cylinder chamber on one side of the piston communicates with a pipe 117, and another longitudinal channel 118 by which the cylinder chamber on the other side of the piston 114 communicates with a pipe 119. Suitable packing 120 engages the piston rod 115 and is held between the caps 112 and the ends of the cylinder 113. The pipes 117 and 119 are connected with opposite ports of the valve plate 46. Thus the pipe 117 is connected by pipes 121, 122, 123 and 124 with the ports 45 of the two valve plates 46, while from the pipe 119, connection is made with the other ports 44 of the valve plates through pipes 125, 126, 127 and 128.

It will be obvious that should the pressure in the circulating path, that is to say in the ports 44 or 45, whichever happen to be the pressure ports at the time, exceed a certain amount corresponding to the resistance of the spring 109, the pressure acting on the packing 120 at one side of the piston 114 will move the cylinder 113 in one direction. The cap 112 at one end of the cylinder will, by its engagement with the projection 111 on the adjacent ring 107 or 108, force such ring away from the corresponding projection 110, of the casing 75, against the resistance of the spring 109. In Fig. 4, the lugs 105, 106 of the rings 107, 108 are in engagement with the projections 76' on the rocking member 76. Of course, this is a special position, and the said projections 76' will not always engage said lugs when the rings 107, 108 are seated on the projections 110. In any event, the movement of the cylinder 113 will either immediately, or after a short idle stroke, cause the rocking member 76 to swing, owing to the engagement of the lugs 105, 106 with the projections 76'. This swinging motion will, according to its direction, either lower or raise the rods 68, by means of the arms 72, and thus alter the inclination of the tilting box 60. The connections are made in such a manner that this operation will reduce the inclination of the tilting box and thus automatically reduce the speed with which the motive oil flows through the power-transmitting system, and therefore the speed of the motors 52, 53, whenever the pressure exceeds a certain limit. The parts will find a position of equilibrium as soon as the increasing tension of the spring 109 balances the pressure on the pressure-side of the piston 114.

It will be noted that the automatic control just explained does not interfere with the simultaneous operation of the manual control. By reference to Fig. 3, it will be understood that if the lever 77 moves in response to automatic control, the cylinder 80 of the telescopic or extensible link will move with said lever, but the link portion 81 will remain stationary, the spring 102 being simply put under tension as either the plate 100 or the plate 101 is moved by the link portion 80, depending on the direction in which the lever 77 has been swung. The automatic operation therefore will not affect the position of the floating lever 85. On the other hand, irrespective of the position to which the lever 77 may have been adjusted by the automatic control described, the manual control may be operated at any time by means of either handwheel 99.

The following arrangement is provided for cooling the liquid (oil) which is contained in the casings of the pumps 41, 42 and of the motors 52, 53: From the upper portions of the pump casings (which are full of oil) pipes 129 lead upward to a pipe 130 from which pipes 131, 132 lead to an oil expansion tank indicated at 133, said tank being located at a level sufficiently high to insure a good circulation of oil on the thermo-siphon principle. It will be understood that the tank 133 is not filled with oil to the top, so as to allow room for expansion. This tank has an outlet, below the surface or level of the oil therein, through which the heated oil passes into a radiator 134 of any suitable construction, and from the outlet of the radiator the cooled oil passes through a pipe 135 to the inlet port of a suitable pump 136, which may be a rotary pump having its shaft 137 driven by suitable connections, as a sprocket-and-chain arrangement 138 connected with one of the shafts 39. The pump 136 has a delivery pipe 139 from which connections 140, 141 lead to the lower portions of the pump casings 41, 42 respectively. Cool oil is thus supplied to the pump casings at the bottom, while heated oil is removed at the top, and by this circulation the temperature of the oil and of the pumps 41, 42, is kept within proper limits. From the pipe 139 the cool oil is also led by pipes 142 and 143 to the lower portions of both motor casings 52, 53, and the heated oil rises from the top of said casings through pipes 144, connected with the pipes 132 by a pipe 145. Thus the heated oil both from the pumps 41, 42, and from the motors reaches the expansion tank 133 and is returned to the said pumps and motors in a cooled condition, whereby any overheating of the parts is prevented.

The radiator 134 is cooled by means of air entering a roof compartment 146 through openings such as 147, passing out of said compartment through an opening 148 and into a channel or chamber 149 in which said radiator is located, then through a water-cooling radiator 150 which by means of suitable pipes (not shown) is connected with the usual water jacket of the engine 32 and then through a passage or trunk 151 to the suction inlet of a fan indicated at 152. The fan shaft 153 may be driven by means of bevel gearing 154, a vertical shaft 155, and bevel gearing 156, from one of the shafts 39. The air sucked in by the fan 152 is thrown out through an opening 157 into a roof compartment 146' having outlets 158. This roof compartment 146' also has an inlet 159 receiving heated air which a second fan 160 on the shaft 153 draws from a chamber or compartment 161 formed by walls 162, 163 and containing the engine 32. Air enters said compartment at the fly-wheel 36 and at various openings provided at the lower portion of the compartment.

It is desirable to provide a pressure gauge in each of the cabs 31 so that the engineer may receive warning of any abnormal rise or fall of pressure in the pump-motor circulating system. For this purpose, I have provided pipes 164, 165 connected with the pipes 123, 127 respectively and therefore with the ports 45 and 44 respectively. These pipes 164, 165 communicate with aligning tubular members 166, the connection being effected by cap-like unions 167 and nipples 168. The ends of the tubular members 166 are screwed into a valve body 169 having a central chamber 170 in which is movable lengthwise a ball valve 171 adapted to become seated on either one of the seats 172 at the inner ends of the tubular members 166. A plug 173 normally closes a downward connection from the chamber 170, while an upward connection 174 leads to a pipe 175 connected with a longitudinal pipe 176 extending from one cab 31 to the other and having connections 177 to gauges 178. Cocks 179 may be provided, if desired, to control the gauge connections. It will be obvious that the valve 171 will shift automatically whenever the ports 44, 45, change in function (from pressure to suction and vice-versa), as they do when the locomotive changes from forward to rearward travel, or vice-versa. The gauge connections 175, 176, 177 will therefore always remain connected with that pipe 164 or 165 which at the time is connected with the pressure ports of the pumps 41 and 42. The pipe 165 or 164 which at the time is connected with the suction ports of the pumps will however be shut off from the pressure connections, by the valve 171, as will be obvious from Fig. 6.

Finally, a brake arrangement has been shown which will operate automatically whenever the pressure in the presure port of the power-transmitting oil system exceeds a predetermined pressure. For this purpose, transverse pipes 180 are connected with the pipe 176 and from the pipes 180 pipes 181 lead downward to brake cylinders 182 containing pistons 183 urged upward by coiled springs 184. Each piston rod 185 is pivotally connected at 186 with a brake lever 187 fulcrumed at 188 and suitably connected with a brake shoe 189 to cooperate with the adjacent wheel 25. Whenever an abnormal pressure, due for instance to a failure of the automatic control to operate, enables the pistons 183 to overcome the tension of the springs 184, the brakes will be applied automatically. To enable the brakes to be applied by hand whenever desired, an arrangement of the following character may be adopted, for instance: The two brake levers 187 at the same end of the locomotive are connected by a bar or beam 190, which may be pulled down by means of a chain 191 passing under a guide roller 192 and winding on a sheave or drum 193 secured to a shaft 194 provided with a hand-wheel 195.

I claim:

1. In a power plant, an engine, pumping mechanism driven by said engine, a motor driven by the fluid propelled by said mechanism, driven mechanism operated by said motor, and brake mechanism effective upon said driven mechanism and operated by an abnormal rise of the pressure in the fluid-path.

2. In a power plant, an egine, a pump driven by said engine, a fluid-operated motor, a pressure connection leading the fluid from the delivery port of the pump to the inlet of the motor, a return conduit leading the fluid from the outlet of the motor to the suction port of the pump, driven mechanism operated by said motor, and brake mechanism effective upon said driven mechanism and operated by an abnormal rise of the pressure in said pressure connection.

3. In a power plant, an engine, a reversible pump having two ports adapted to exchange their functions as pressure port and suction port respectively according to the manner of operating said pump, brake mechanism adapted to become operative when a certain pressure is exceeded, driven mechanism upon which said brake mechanism is effective, piping leading to said brake mechanism, an automatic valve which always connects said piping with that port of the pump which at the time is the pressure port, a fluid-operated motor operatively connected with said driven mechanism, and connections for leading the fluid from the pressure port of the pump to the inlet of the motor, and from the outlet of the motor to the suction port of the pump.

4. In a power plant, a pump having two ports adapted to exchange their functions as pressure port and suction port respectively according to the manner of operating said pump, a reversible fluid-operated motor having ports adapted to exchange their functions as inlet and outlet respectively, driven mechanism operated by said motor, connections for leading the fluid from the pressure port of the pump to the inlet of the motor, and from the outlet of the motor to the suction port of the pump, brake mechanism adapted to become operative upon said driven mechanism when a certain pressure is exceeded, a pipe leading to said brake mechanism, and an automatic valve which always connects said pipe with that port of the pump which at the time is the pressure port.

5. In a power plant, an engine, a pump driven by said engine, means for controlling the output of said pump, individual manual controls for said pump-output controlling means, located at points distant from each other, a lost motion connection between said pump controlling means and said manual controls and common to said manual controls, and a motor driven by the fluid propelled by said pump.

6. In a power plant, an engine, a pump driven thereby, having an adjustable member for controlling its output, a motor driven by the fluid propelled by said pump, means, operated automatically when the pressure at the delivery port of the pump exceeds a certain limit, for moving said member to reduce the output of said pump, a floating lever having a lost motion connection with said means, and manually controlled mechanism for operating said floating lever to change the output of the pump as desired.

7. In a power plant, an engine, a pump driven by said engine, a motor operated by the fluid propelled by said pump, a lever, manually-operated devices extending to opposite ends of said lever, means for varying the output of the pump, said means including an extensible sectional link connected with the central portion of said lever and having a spring to connect its sections yet allowing one section of the link to move relatively to the other, and an automatically acting control for the output of the pump, said automatic control being connected with a link portion different from the one attached to said lever.

8. In a power plant, an engine, a pump, driven by said engine, having an adjustable member for varying its output, means, associated with said member and operated automatically when the fluid pressure at the delivery port of said pump exceeds a certain limit, to reduce the output of said pump, a plurality of controls at points distant from each other, connections between said adjustable member and said plurality of controls, including a lost motion device, for changing the output of the pump irrespective of the automatic regulation thereof, and a motor driven by the fluid of said pump.

9. In a power plant, an engine, a pump, driven by said engine, a fluid motor and conduits connecting it with said pump, said pump having an adjustable member for varying its output, means operated automatically by the pressure of the fluid delivered by said pump, connections between said means and adjustable member for preventing the output of said pump from exceeding a certain limit, said connections including a lost motion device, a pair of independently operated manual controls and connections therefrom to said adjustable members, said last named connections also including a lost motion device, said lost motion devices permitting independent movement of said adjustable member either by said manual controls or by said automatic means.

10. In a power plant, an engine, a pump, driven by said engine, a fluid motor and conduits connecting it with said pump, said pump having an adjustable member for varying its output, means operated automatically by the pressure of the fluid delivered by said pump, connections between said means and adjustable member for preventing the output of said pump from exceeding a certain limit, said connections including a lost motion device, a pair of independently operated manual controls and connections therefrom to said adjustable members, said last named connections including a lever and pivotal connections from the ends thereof to asid manual controls, and a telescoping link connection between the central part of said lever and said adjustable member.

11. In a power plant, an engine, a pump driven by said engine, a motor, connections for leading the liquid from the pump to the motor and for returning the liquid from the motor to the pump, an expansion tank located above said motor and pump, connections leading upwardly from said motor and pump to said tank, a radiator connected with said tank to which the liquid in said tank passes, a fan for forcing cooling air through said radiator, a continuous conduit enclosing said fan and radiator, said conduit including compartments located adjacent to the roof of the plant and having inlet and outlet openings through said roof for the ingress and egress of air and connections for returning the cooled liquid to the pump and motor casings.

In testimony whereof I have signed this specification.

JOHN ROBSON.